March 7, 1967 — H. S. CLOYD ETAL — 3,307,739

CONTAINER

Filed Oct. 1, 1964 — 2 Sheets-Sheet 1

Harold S Cloyd
Ralph M Dudley
Robert T Mangold
Richard W Welch
INVENTORS

BY Ralph Hammar
Attorney

Harold S Cloyd
Ralph M Dudley
Robert T Mangold
Richard W Welch
INVENTORS

BY Ralph Hammar
Attorney

United States Patent Office 3,307,739
Patented Mar. 7, 1967

3,307,739
CONTAINER
Harold S. Cloyd, Ralph M. Dudley, Robert T. Mangold, and Richard W. Welch, Erie, Pa., assignors to Nosco Plastics, Incorporated, Erie, Pa., a corporation of Pennsylvania
Filed Oct. 1, 1964, Ser. No. 400,686
6 Claims. (Cl. 220—97)

This invention is a plastic container for bulk freezing and storage of fruits and the like.

Figure 1:
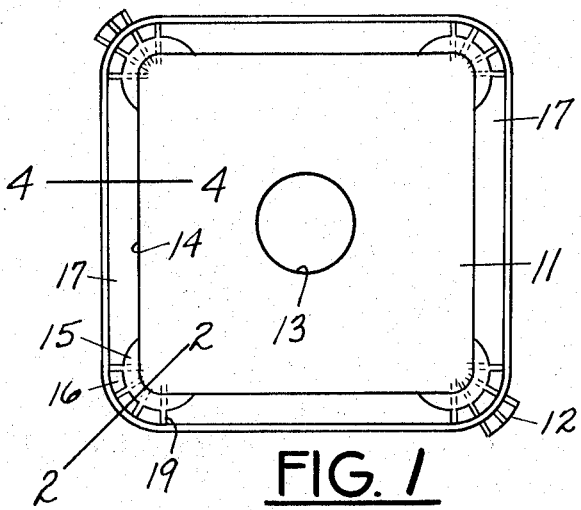
Figure 4:
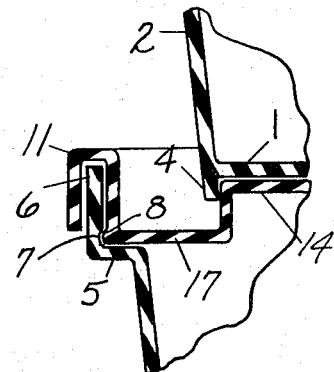
Figure 2:
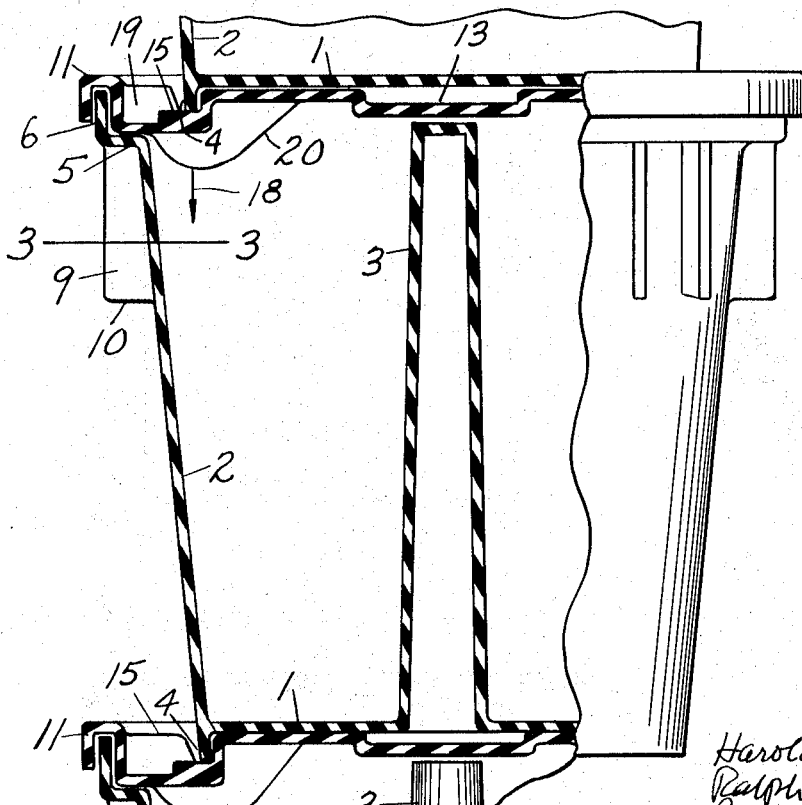
Figure 3:
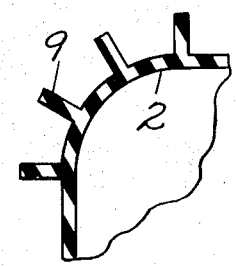
Figure 5:
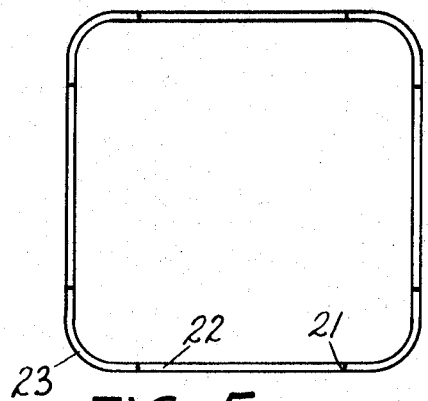
Figure 6:
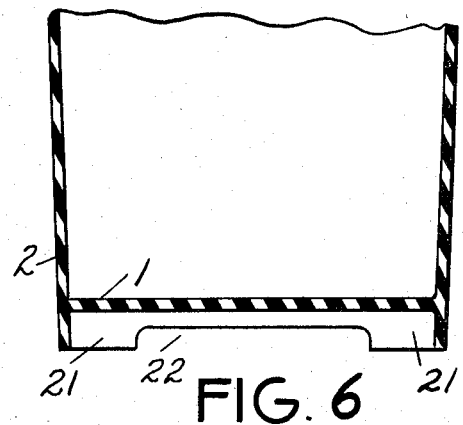
Figure 7:
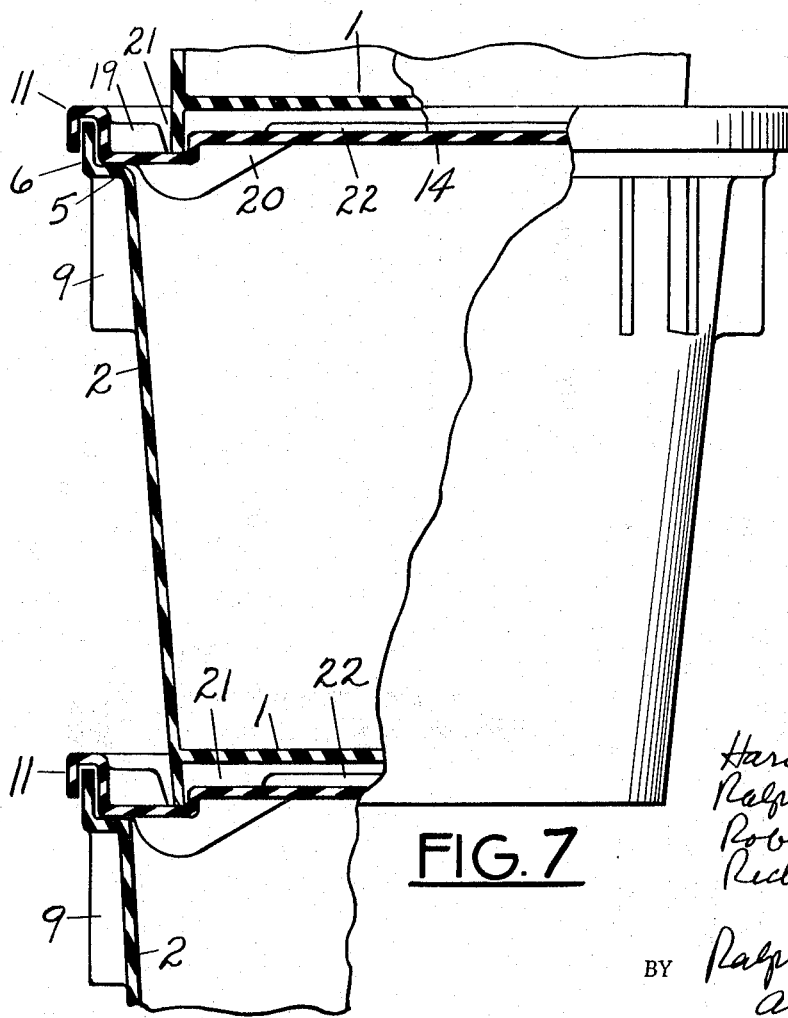

In the drawing, FIG. 1 is a top plan view of a container, FIG. 2 is a section on line 2—2 of FIG. 1, FIG. 3 is a section on line 3—3 of FIG. 2, FIG. 4 is a section on line 4—4 of FIG. 1, FIG. 5 is a bottom view of a modification of the container, FIG. 6 is a fragmentary sectional elevation of the modification, and FIG. 7 is an elevation partly broken away showing the relation of stacked containers.

The container is for bulk freezing and storage, for example, in thirty to fifty pound units. These containers are loaded with fresh fruit which is palletized and stacked in a cold room where the fruit is quick frozen. When the fruit is withdrawn for use, the containers are thawed just enough to loosen the frozen fruit, for example by spraying the containers with water, so that the fruit can be dumped out of the containers.

The container has a one piece body of molded plastic such as polyethylene with a bottom wall 1 and side walls 2. As shown in FIG. 1, the container is roughly square so as to obtain the greatest volume of storage per square foot of floor area. At the center of the bottom wall is an upstanding tube 3 closed at its upper end and extending substantially the full height of the container. The purpose of the tube is to provide access of cold air to the center of the mass of fruit and thereby provide quicker freezing. The side walls 2 flare outward from the bottom toward the top of the container and the tubular section 3 flares inward from the bottom toward the top, thereby providing draft which permits quick release of the frozen fruit. After only a slight thawing caused by spraying water on the outer surfaces of the container, the frozen fruit easily slides out of the container as a solid frozen mass. This permits quick unloading of the containers. The tubular section 3 at the center materially improves the quality of the fruit by allowing quick freezing both from the inside and from the outside and avoiding the usual core of lower quality (slower frozen) fruit at the region occupied by the tube 3.

The lower ends of the side walls 2 have a depending rim 4 which acts as a load transfer surface when the containers are stacked one on top of the other as shown in FIG. 2. The upper ends of the side walls 2 terminate in a rim having outwardly and upwardly extending flanges 5 and 6. At the junction of the flanges 5 and 6 opposite the midsections of each of the side walls there is an undercut 7 which cooperates with a projection 8 on the cover to releasably hold the cover in place. On the under side of the flange 5 at the corners are a plurality of ribs 9 integral with the flange 5 and the side walls 2 which re-enforce the corners of the container. The lower ends 10 of the ribs serve as nesting stops when the empty containers are nested for storage.

The cover has a rim 11 telescoped over the upstanding flange 6 and handles 12 at diagonally opposite corners of the rim. At the center the cover has a depressed section 13 overlying the upper end of the tube 3 and a raised section 14 which fits within the depending rim 4 at the lower end of the container.

At each of the corners is a pad 15 between the raised section 14 and the rim 11 of the cover. The pad is raised sufficiently above the adjoining surfaces 16 and 17 of the cover so that the load is received entirely by the pads 15 and not on the surfaces 16, 17. The purpose of this is to increase the load carrying ability of the container by concentrating the directly applied load at the corner sections. Note that in FIG. 2 the rim 4 rests directly on the pad 15 while in FIG. 4 the rim 4 is spaced above the surface 17 between the corner sections. The force received by the pads 15 acts in the direction of arrow 18 which, it will be noted, is offset inward from the corner of the container. If this offset load were applied to the upper ends of the side walls 2, it would push the side walls outward and cause bulging, reducing the load carrying ability. However, when applied to the corners, the offset load does not cause bulging but instead tends to push the corners outward, places the side walls under tension between the corners and maintains the shape of the rim 5, 6 of the container and the tight fit with the cover thereby substantially increasing the load carrying ability. To still further aid the load carrying ability, there are on the cover a plurality of distributed ribs 19 extending between each pad 15 and the adjacent section of the rim 11 of the cover and on the underside of the cover directly beneath the ribs 19 are a plurality of ribs 20 which further stiffen the corner sections of the cover.

By concentrating the load at the corner sections, the containers can be stacked, loaded with fresh fruit to the full height used in palletized storage (from twenty to thirty feet) and the lowermost container will have sufficient strength to support the containers above it. Of course, after the contents of the containers are frozen, the frozen mass of fruit is self supporting, but the load carrying ability is needed while the fruit is unfrozen.

The cover with the telescoping rim 11 alone is not enough to provide the necessary load carrying ability for stacked storage. However, when the corners of the rim 11 are stiffened by one or more of the structural features shown at 15, 19, 20, a marked improvement is obtained. The corners of the cover are kept from bowing under load and by maintaining the shape of the corners, the parts are kept in the shape best adapted to sustain loads. The stiffening of the corners of the container by the ribs 9 has a similar effect. Concentrating the load applied from an upper container at the corners prevents localized bending which could deflect the cover and the side walls away from the best load carrying position. The problem is made difficult by the loads which the lowest container must carry in palletized storage, by the relatively thin and flexible plastic walls of the container and cover and by the taper or draft which offsets the load.

In the modification of FIGS. 5, 6, 7, corresponding parts are indicated by the same reference numerals. The tube 3 is omitted. The pads 15 at the corners of the cover are omitted, but could be included if desired. The rim 21 (corresponding to rim 4) is cut away between the corners as indicated at 22, thereby concentrating the load at the corner sections 23. When stacked, the cut out sections 22 clear the cover of an underlying container so the load is concentrated at the corners.

What is claimed as new is:
1. A container for stacked storage of frozen fruit and the like having a polygonal bottom wall and side walls flaring outward from the bottom to the top, the side walls having portions depending below the bottom wall at the junctions or corners of the side walls and serving as load transmitting surfaces and having a top rim having outwardly extending flanges serving as load receiving surfaces, ribs on the outside of the side walls and the underside of the flanges at the corners stiffening the top rim, a cover telescoped over the top rim, said cover having pads at the corners for receiving the depending portions of an upper container, said cover having portions intermediate the pads spaced below the depending por- tions of the upper container whereby the load of the upper container is concentrated at the corners of the underlying container.

2. A container for stacked storage of frozen fruit and the like having a polygonal bottom wall and side walls flaring outward from the bottom to the top, the side walls having portions depending below the bottom wall at the junctions or corners of the side walls and serving as load transmitting surfaces and having a top rim having outwardly extending flanges serving as load receiving surfaces, ribs on the outside of the side walls and the underside of the flanges at the corners stiffening the top rim, a cover telescoped over the top rim, said cover having a raised portion at its center telescoped within said depending portions of the upper container, said cover having pads at the corners for receiving the depending portions of an upper container, said cover having portions intermediate the pads spaced below the depending portions of the upper container whereby the load of the upper container is concentrated at the corners of the underlying container.

3. A container for stacked storage of fruit and the like having a polygonal bottom wall and side walls flaring outward from the bottom to the top, the side walls having portions depending below the bottom wall at the junctions or corners of the side walls and serving as load transmitting surfaces and having a top rim having outwardly extending flanges serving as load receiving surfaces and upwardly extending flanges at the outer part of the outwardly extending flanges, a cover telescoped over the upwardly extending flanges of the top rim, said cover having a depressed portion resting on the outwardly extending flanges of the top rim, pads at the corners of the cover for receiving the depending portions of an upper container, said cover having portions intermediate the pads spaced below the depending portions of the upper container whereby the load of the upper container is concentrated at the corners of the underlying container.

4. A container for stacked storage of frozen fruit and the like having a polygonal bottom wall and side walls flaring outward from the bottom to the top, the side walls having depending portions at the junctions or corners of the side walls and serving as load transmitting surfaces and having a polygonal top rim serving as load receiving surfaces, ribs on the outside of the side walls at the corners stiffening the top rim, a cover telescoped over the top rim, said cover having pads at the corners for receiving the depending portions of an upper container, said cover having portions intermediate the pad spaced below the upper container whereby the load of the upper container is concentrated at the corners of the underlying container.

5. A container for stacked storage of frozen fruit and the like having a polygonal bottom wall and side walls flaring outward from the bottom to the top, the side walls having depending portions at the junctions or corners of the side walls and serving as load transmitting surfaces and having a polygonal top rim serving as load receiving surfaces, ribs on the outside of the side walls at the corners stiffening the top rim, a cover telescoped over the top rim, said cover having a raised portion at its center telescoped within said depending portions of the upper container, said cover having pads at the corners for receiving the depending portions of an upper container, said cover having portions intermediate the pads spaced below the upper container whereby the load of the upper container is concentrated at the corners of the underlying container.

6. A container for stacked storage of fruit and the like having a polygonal bottom wall and side walls flaring outward from the bottom to the top, the side walls having depending portions at the junctions or corners of the side walls and serving as load transmitting surfaces and having a polygonal top rim serving as load receiving surfaces, a polygonal cover telescoped over the top rim, said cover having depressed portions within the top rim at the corners for receiving the depending portions of an upper container, said cover having portions intermediate its corners spaced below the upper container whereby the load of the upper container is concentrated at the corners of the underlying container.

References Cited by the Examiner

UNITED STATES PATENTS

| | | | |
|---|---|---|---|
| 2,409,279 | 10/1946 | Hiller | 220—97 X |
| 3,055,540 | 9/1962 | Ringlen | 229—43 X |
| 3,173,571 | 3/1965 | Cserny | 229—43 X |
| 3,191,520 | 6/1965 | Halter | 229—3.5 |

FOREIGN PATENTS

| | | |
|---|---|---|
| 828,152 | 2/1960 | Great Britain. |
| 951,746 | 3/1964 | Great Britain. |

THERON E. CONDON, *Primary Examiner.*

GEORGE E. LOWRANCE, *Examiner.*